United States Patent [19]
Kubo et al.

[11] Patent Number: 5,292,186
[45] Date of Patent: Mar. 8, 1994

[54] CONTINUOUS KNEADING MACHINE

[75] Inventors: Yohji Kubo; Takashi Kobayashi; Akira Toyomi; Yoshiyuki Otake, all of Osaka, Japan

[73] Assignee: Kurimoto, Ltd., Osaka, Japan

[21] Appl. No.: 73,492

[22] Filed: Jun. 9, 1993

[51] Int. Cl.$^5$ .................... B28C 1/16; B01F 7/04
[52] U.S. Cl. ...................... 366/97; 366/298; 366/299; 366/300; 366/301
[58] Field of Search ........... 366/85, 84, 83, 97, 366/297, 298, 299, 300, 301; 425/207, 208, 209, 200

[56] References Cited

U.S. PATENT DOCUMENTS

| | | | |
|---|---|---|---|
| 2,814,472 | 11/1957 | Erdmenger | 366/97 |
| 3,195,868 | 7/1965 | Loomans | 366/85 |
| 4,040,607 | 8/1977 | Ullrich | 366/85 |
| 4,556,324 | 12/1985 | Tynan | 366/85 |
| 4,752,135 | 6/1988 | Loomans | 425/209 |
| 4,871,259 | 10/1989 | Harada | 366/85 |

FOREIGN PATENT DOCUMENTS 4-171033  6/1992  Japan .

*Primary Examiner*—Robert W. Jenkins
*Attorney, Agent, or Firm*—Jones, Tullar & Cooper

[57] ABSTRACT

A continuous kneading machine capable of achieving selfcleaning, improvement in kneading efficiency, and reduction in abrasion of paddles is provided. This continuous kneading machine is characterized in that sectional shape of one paddle in a section perpendicular to a rotation shaft is formed of n (where n is an integer, and $n \geq 2$) pairs of major radius parts and minor radius parts which are alternately arranged with equal angle and formed by a gentle curve, and that sectional shape of another paddle is formed of m (where m is an integer, $m \geq 2$, and $n \neq m$) pairs of major radius parts and minor radius parts which are formed by an escribed envelope curve drawn by rotation in cooperation with the one paddle, and in which rotation of another paddle is performed in a direction different from the one paddle at a different ratio of rotation frequency.

1 Claim, 9 Drawing Sheets

CONTINUOUS KNEADING MACHINE

BACKGROUND OF THE INVENTION

1. Field of the Invention

The present invention relates to a continuous kneading machine in which process for uniformly mixing and kneading various kinds of materials in a state of liquid, viscous substance or powder is performed.

2. Prior Art

FIG. 14 shows one of kneading machines heretofore known.

This known kneading machine is provided with at least two pairs of lense-shaped paddles (b), (c) respectively arranged in a cylindrical body (a) formed of two partially crossover circles in section so as to engage with each other and rotate in the same one direction within the cylindrical body (a). When rotating the paddles (b), (c), a self-cleaning is performed in such a manner that internal wall of the cylindrical body (a) and external surface of the baddles (b), (c) are scraped. At the same time, as a result of continuous change in sectional area of a space formed between the paddles (b), (c) engaged each other and the internal wall of the body (a) to be occupied by the treated materials, compression and expansion of the materials takes places repeatedly, resulting in mixing and kneading of the materials.

There exist, however, following problems to be solved in the mentioned conventional kneading machine:

1) Referring to FIG. 14, when rotating the two paddles (b), (c) in the same one direction indicated the arrows, it happens that a material held in a space (d) (hereinafter referred to as "material space") to be filled with the material put between the paddles (b), (c) and the body (a) moves leftward, while a material held in another material space (e) moves counterclockwise downward, and therefore the materials are difficult to encounter each other. In other words, even if the material held in the material space (d) moves after the material held in the material space (e) to catch it up, the latter material held in the material spcae (e) cannot be caught but moves away. Likewise, on the underside, a material held in the material space (f) moves counterclockwise downward, while a material held in the material space (g) moves rightward, and the materials are difficult to encounter each other. As a result, no effective kneading takes place.

2) So long as the two paddles (b), (c) are rotated at equal speed, there is a possibility of encountering and mixture only between the limited and unchanged part of the materials every rotation, no matter how rotation of the two paddles is repeated. This is another problem resulting in insufficient kneading.

3) Because of little change in the sectional area of respective material spaces, no efficient kneading takes place.

4) Since the pair of paddles (b), (c) rotate in contact with each other for the purpose of self-cleaning, one end of either paddle is always in contact with another paddle, hence there arises a further problem of local or partial abrasion of such contact portion, as compared with other portions on the paddles.

SUMMARY OF THE INVENTION

The present invention was made to solve the above-discussed problems and has an object of providing a continuous kneading machine capable of achieving self-cleaning, improvement in kneading efficiency, and reduction in abrasion of paddles.

In order to accomplish the foregoing object, there is provided according to the invention a continuous kneading machine comprising a cylindrical body of which sectional shape is formed of a plurality of circles partially crossover each other, rotaion shafts disposed in said circles in parallel thereto in the same number as said circles, and a number of paddles disposed on said rotation shafts forming a plurality of pairs so as to engage with each other, characterized in that sectional shape of one paddle in a section perpendicular to a rotation shaft is formed of n (where n is an integer, and $n \geq 2$) pairs of major radius parts and minor radius parts which are alternately arranged with equal angle therebetween and formed by a gentle curve, and that sectional shape of another paddle is formed of m (where m is an integer, $m \geq 2$, and $n \neq m$) pairs of major radius parts and minor radius parts which are formed by an escribed envelope curve drawn by rotation in cooperation with said one paddle, and in which rotation of said another paddle is performed in a direction different from said rotation shaft of said one paddle at a different ratio of rotation frequency.

In this respect, any paddle of screw, flat, helical or counter-helical type may be preferably employed as the mentioned paddles.

In the continuous kneading machine of above construction, when the mentioned rotation shafts of the two paddles are rotated respectively in different directions, one paddle comes in contact with another paddle at a variable contact point on an external surface of each paddle in such a manner as to have a common tangential line at all times. Accordingly, self-cleaning is performed between the associated paddles.

When rotating the two paddles in different directions and at different rotation frequency, the paddles are rotated in such a manner that either a top of the major radius part of one paddle is kept in contact with a top of the minor radius part of another paddle, or a top of the minor radius part of one paddle is kept in contact with a top of the major radius part of another paddle.

During such rotation, two material spaces (maximum space area) are formed between the paddles and cylindical bodies when the two spaces are in a separated state from each other.

Then, the mentioned two material spaces gradually comes near to be overlapped or combined each other, one rotating clockwise while another counterclockwise, and are then combined to be one narrow material space (minimum space area) formed among the top of the major radius part of one paddle, the top of the minor radius part of another paddle, and circular part of another cylindrical body. Subsequently, the material space once narrowed is enlarged to be separated again into the mentioned two material spaces.

Following the mentioned change in the material spaces, materials held or contained respectively in the two material spaces begin to be combined according to the ongoing rotation of the two paddles, then being gradually compressed, and further compressed to a great deal in the narrowed one material space.

Since the materials held separately in the two material spaces join together to form a narrow material space in such a manner as to move and encounter from both sides, one paddle rotating clockwise while another paddle rotating counterclockwise, the materials surely have incresed opportunities of encountering with each other resulting in sufficiently uniform mixing.

Since number (n pairs) of the major radius parts and minor radius parts of one paddle is not equal to that (m pairs) of the major radius parts and minor radius parts of another paddle, numbers of the material spaces formed respectively on the two paddles are different. Accordingly, when the materials once combined are expansively separated and compressively combined again, the material in the material space of one paddle is further mixed with the material in the material space of another paddle, thereby a quite effective kneading being achieved. Moreover, the mentioned two material spaces are first formed to be almost horizontally longitudial (at the upper part) according to the ongoing rotation of the two paddles, then largely transformed to be one narrow vertically longitudinal space, and as a result of such transformation, i.e., change of shape in the material spaces, the materials held in the material spaces are compressively and expansively deformed. In this manner, kneading efficiency is significantly improved. In addition, since there is a difference in the rotaion frequency between one paddle and another, the contact point between the two paddles is shifted at all times, which means that no local contact concentrated on one limited part takes place between the two paddles (particularly between the top ends of the paddles).

Other features and advantages of the invention will become apparent in the course of the following description in conjunction with the accompanying drawings.

BRIEF DESCRIPTION OF THE DRAWINGS

In the drawings forming a part of the present application, in which the same reference numerals are designated to like parts throughout the same.

DESCRIPTION OF THE PREFERRED EMBODIMENTS

Several embodiments according to the present invention is hereinafter described with reference to the drawings.

Figure 1:
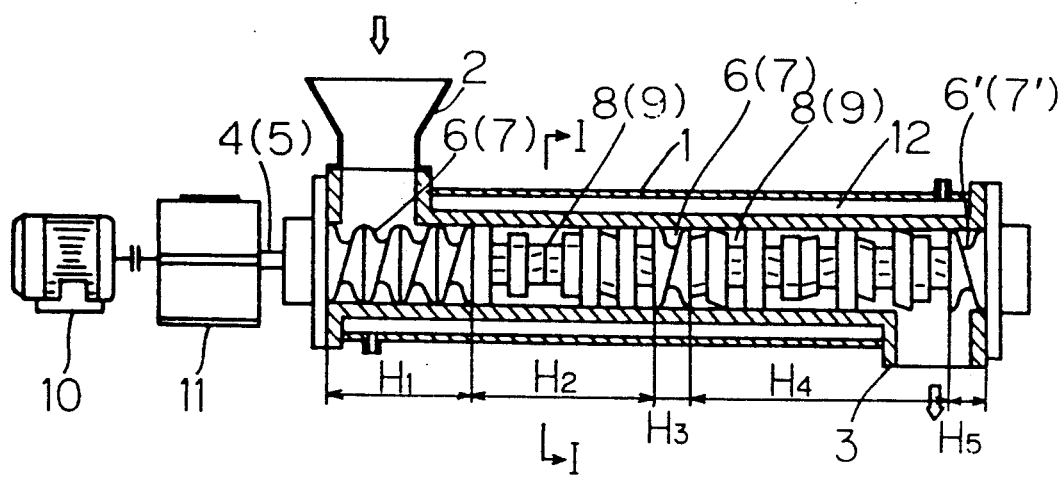
FIG. 1 is a longitudinal sectional view of a continuous kneading machine according to an embodiment of the present invention.
Figure 2:
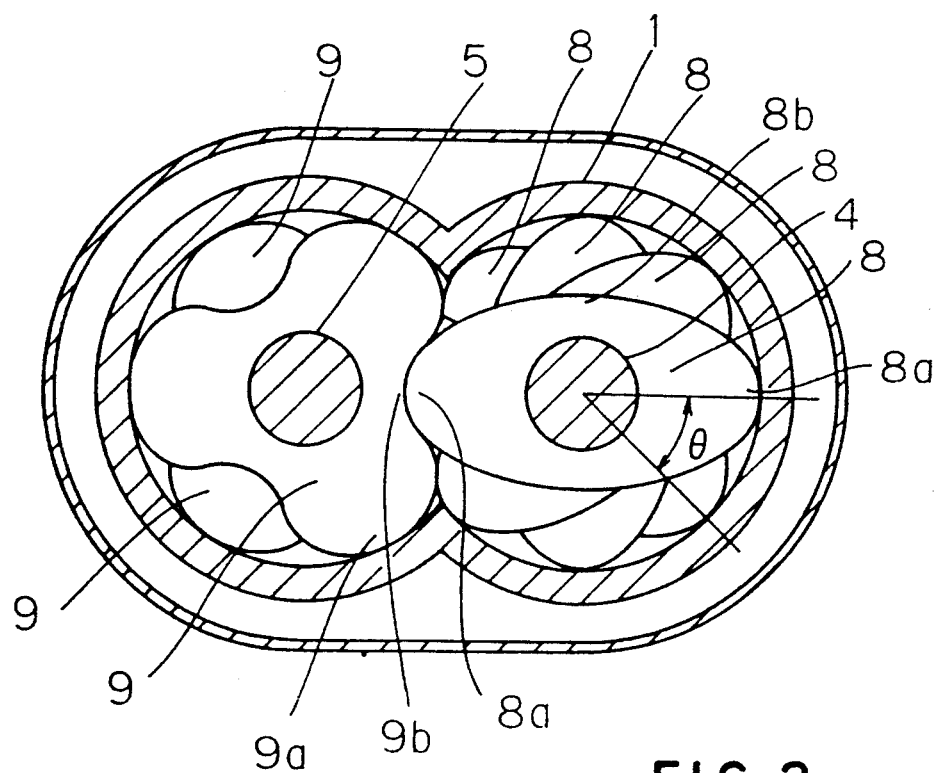
FIG. 2 is a sectional view taken along the line I—I in FIG. 1.
Figure 3:
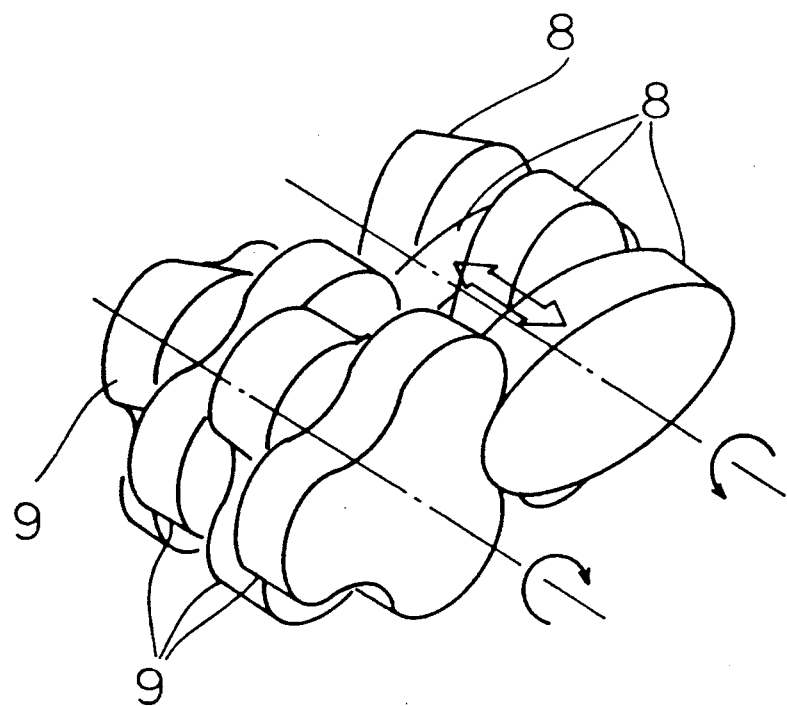
FIG. 3 is a partially perspective view showing a combination between the paddles in the same embodiment.

Referring to FIGS. 1 to 3, reference numeral (1) indicates a cylindrical body of which secion is formed of two circles of equal diameter partially crossing over each other and each of the circles being provided with a supply port (2) at one upper end and a discharge port (3) at another lower end. Rotation shafts (4), (5) are provided in parallel to each other in each of the mentioned two circles in section. A plurality of paddles (6), (7), (8), (9) are mounted on the rotation shafts (4), (5) in axial directions thereof to form one unit as a whole.

Reference numeral (10) indicates a motor which is connected to the rotation shaft (4) through a reduction gear (11). The roation shaft (5) is interlocked with the mentioned reduction gear (11), though not illustrated. Reference numeral (12) indicates a heating/cooling jacket.

Thus a continuous kneading machine is constructed.

Construction and function of the above continuous kneading machine are hereinafter described in more detail.

H1 indicates a combination of the feed screw type paddles (6), (7), in which materials (such as fine particles and binders) supplied through the supply port (2) are kneaded and stirred, then delivered to H2.

H2 indicates a combination of the paddles (8), (9), i.e., flat paddles, helical paddles and counter-helical paddles. The flat paddles perform kneading operation and do not perform feeding operation. The helical paddles perform not only kneading operation but also feeding operation. The counter-helical paddles perform not only kneading operation but also feedback operation.

H3 indicates a combination of the screw type paddles (6), (7) performing feeding operation other than kneading operation in the same manner as H1.

H4 indicates a combination of the paddles (8), (9) in the same manner as H2.

H5 indicates a combination of screw type paddles (6'), (7') for feedback operation, each performing not only kneading operation but also feedback operation.

It is to be noted that each of the foregoing combination of H2 and H4 merely shows an example, and any other combination may be adopted. It is also preferable to form H1, H3 and H5 of the paddles (8), (9), or to form H2, H4 and H5 entirely of the screw type paddles (6), (7). it is also preferable to form a part of them with the paddles (6'), (7)' for feedback operation. For arranging the paddles (8) on the rotation shaft (4), an angle ($\theta$) is established to be by 45° between one paddle (8) and another as shown in FIG. 2. However, this angle of 45° is not always essential and any other angle for such arrangement may be freely established.

Figure 4:
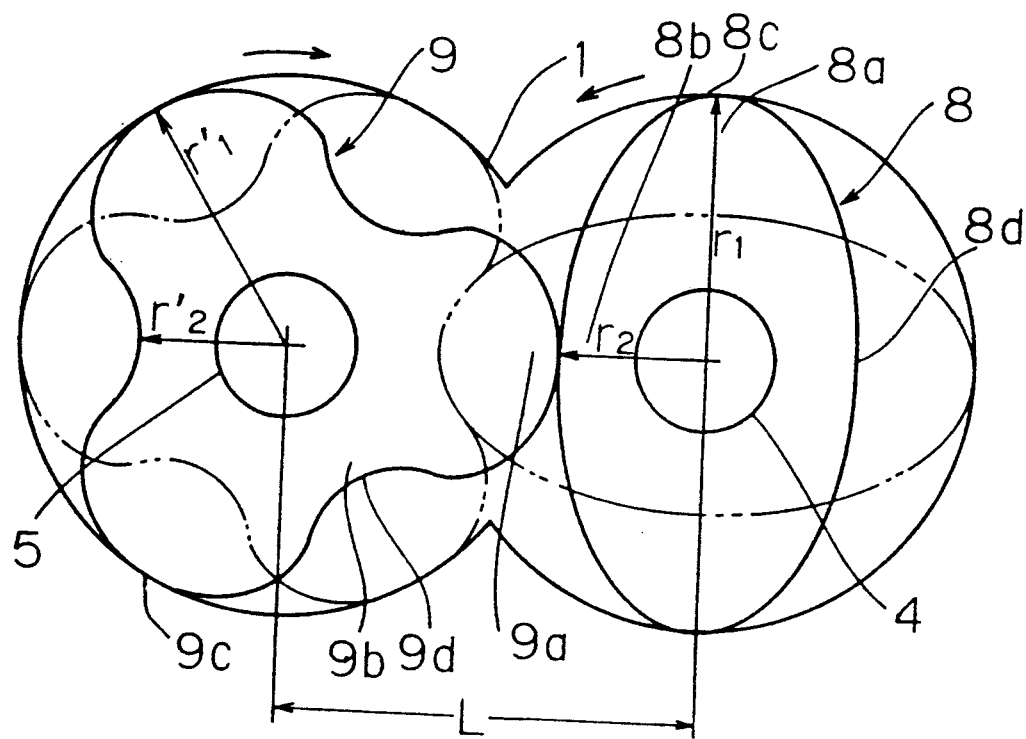
FIG. 4 is an explanatory view showing a top of the minor radius part of one paddle in contact with a top of the major radius part of another paddle in the same embodiment.

The paddles (8), (9) are hereinafter described in detail with reference to FIG. 4 showing a pair of flat paddles.

The (one) paddle (8) forms an ellipse when sectional shape thereof is formed with a gentle curve so as to have n=2 pairs of major radius parts and minor radius parts arranged alternately with equal angle therebetween. It is hereby supposed that (8a), (8b) indicate the major radius part and the minor radius part respectively, and (8c), (8d) indicate top of the major radius part and top of the minor radius part respectively, and that r1 indicates a radius of the major radius part (long radius) of the ellipse paddles (8), r2 indicates a radius of the minor radius part (short radius), and L indicates a distance between the rotations shafts (4), (5). On the mentioned supposition, a theoretical L can be obtained in the expression of L=r1+r2.

The (another) paddle (9) rotating in cooperation with the rotation shaft (5) but in the direction different from the paddle (8) forms a trefoil having n=3 pairs of major radius part and minor radius parts, on the supposition that ratio of rotation frequency is n1:m1=3:2 when the distance L=r1+r2 and ratio of rotation frequency of the rotation shafts (4), (5) are respectively n1, m1 and that sectional shape of respective paddles (9) is formed by an escribed envelope curve which is drawn plainly by the paddle (8) perpendicular to the rotation shaft (5) and in cooperation with the rotation shaft (5).

On the supposition that the major radius part, minor radius part, top of the major radius part, and bottom of the minor radius part are respectively indicated by (9a), (9b), (9c) and (9d), and that radius of the major radius part (9a) is indicated by r'1, and radius of the minor radius part (9b) is indicated by r'2, when the top (8d) of the minor radius part (8b) of the paddle (8) is rotated by 90° starting from a position in contact with the top (9c) of the major radius part (9a) of the paddle (9) (see solid line) as shown in FIG. 4, then the top (8c) of the major radius part (8a) of the paddle (8) comes in contact with the bottom (9d) of the minor radius part (9b) of the paddle (9) (see two dot chain line). During such rotation, the paddle (8) keeps contact with the paddle (9) at any point on the external surface as a matter of course.

Kneading operation performed by a pair of paddles (8), (9) is hereinafter described with reference to FIG. 5.

Figure 5A:
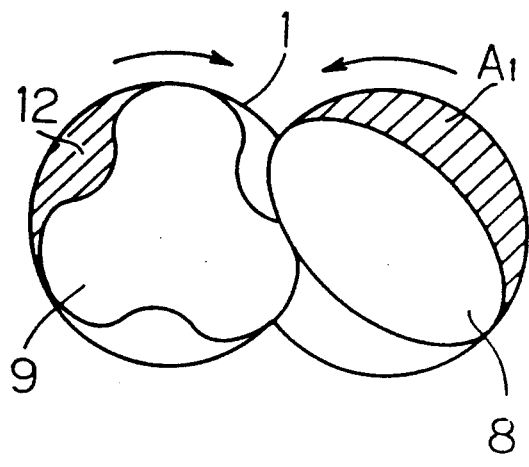
FIGS. 5(a), (b), (c) and (d) are explanatory views respectively showing kneading manners performed by the paddles.

When the paddles (8), (9) are rotated respectively in different directions at a ratio of rotation frequency established as mentioned above, the two paddles rotates at rotational frequency different from each other as a matter of course. Through such rotation, material spaces for containing materials is formed between the internal wall of the body (1) and the paddles (8), (9), and the material spaces move according to the ongoing rotation of the paddles (8), (9) changing their shape in vertical section. The manner of changing the shape of the material spaces is hereinafter described step by step. First, in a state of FIG. 5(a) showing hatched material spaces, a material space A1 on the paddle (8) and a material space A2 on the paddle (9) are in a state separated from each other. In such a separate state, area or volume of the material spaces being sum of the two space A1, A2 is maximum.

Figure 5B:
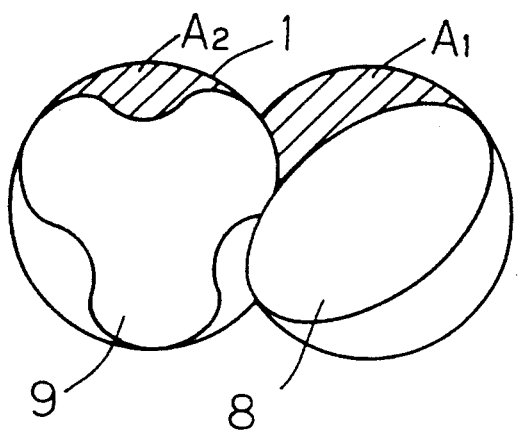

FIG. 5(b) shows a state in which the material space A1 on the paddle (8) and the material space A2 on the paddle (9) have been moved from the mentioned state as a result of a rotation of the paddles (8), (9) by a required angle. In this state, the material space A1 is reduced a little by the major diameter part (9a) of the paddle (9).

Figure 5C:
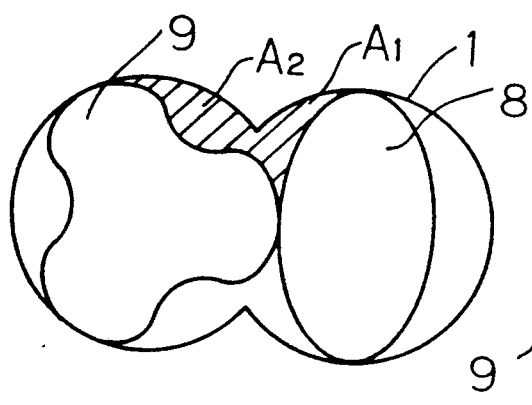

FIG. 5(c) shows a state in which the material space A1 on the paddle (8) and the material space A2 on the paddle (9) have partially joined together and moved as a result of further rotation of the paddles (8), (9). In this state, the material spaces A1, A2 is further reduced.

Figure 5D:
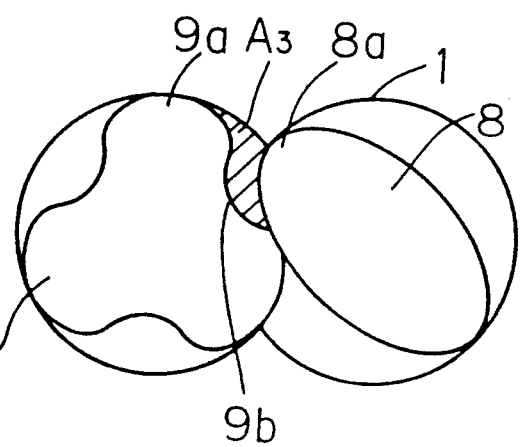

FIG. 5(d) shows a state in which the material space A1 on the paddle (8) and the material space A2 on the paddle (9) have entirely joined together forming one space as a result of further rotation of the paddles (8), (9) (i.e., the paddle (8) has rotated by 180° from the state of FIG. 5(a) and the paddle (9) has rotated by 120° therefrom). In other words, a united material space A3 is formed among the major radius part (8a) of the paddle (8), major radius part (9a) of the paddle (9), minor radius part (9b) thereof and the body (1), and this material space A3 is minimum.

Thus, the material space (volume) changes from A1+A2 to A3 according to the rotation of the paddles (8), (9). In this respect, when calculating change of the sectional area occupied by the respective material spaces, a coefficient $\epsilon$ of change in the sectional area between the maximum space (see FIG. 5(a)) and the minimum space (see FIG. 5(d)) was obtained by the expression of $$\epsilon = A3/(A1+A2) = 1/6.$$

On the other hand, a coefficient $\epsilon'$ of change in the sectional area according to the known construction (see FIGS. 15(a) to (d)) rotated in the same one direction at the same rotational frequency was obtained by the expression of $\epsilon' = A'3/(A'1+A'2) = 1/1.5$.

Accordingly, comparing the construction according to the invention with that according to the prior art, it was recognized that ratio E between the two coefficients of change in sectional area was four times as large as the prior art as shown in the following expression:

$$E = \epsilon/\epsilon' = (1/6)/(1/1.5) = \tfrac{1}{4}.$$

It is clearly understood from the above expression that materials contained in the material spaces are more strongly compressed in the invention resulting in preferable kneading effect. Further, since the materials cointained in the two material spaces come to join together in such a manner as to encounter from both sides, one turning clockwise while another counterclockwise, the materials surely have increasing opportunity of coming into a head-on collision with each other eventually resulting in effective mixing all the more.

Furthermore, the two material spaces A1, A2 assume an almost horizontally longitudinal posture as illustrated in FIG. 5(b) during the rotation of the paddles (8), (9), then come to overlap each other moving from such a posture to be gradually narrowed, and finally transformed largely into one (flattened) material space A3 which is almost vertically longitudinal, as illustrated in FIG. 5(d). In accordance with such change of shape, the materials contained in the material spaces are largely transformed like a wave with high compressibility, eventually resulting in significant kneading effect.

Figure 6:
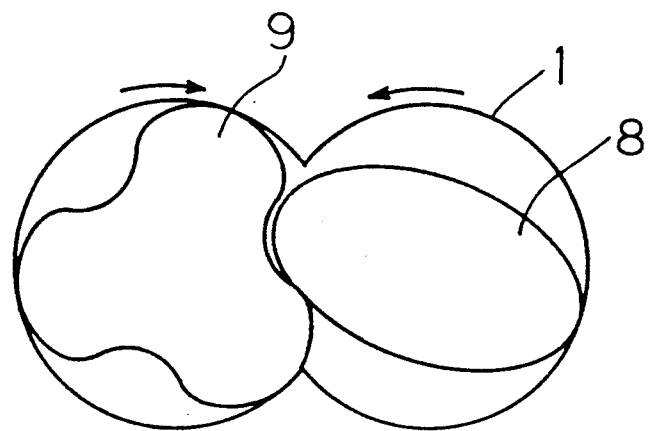
FIG. 6 is an explanatory view showing that the major radius part of one paddle is just going to be engaged with the minor radius part of another paddle.
Figure 7:
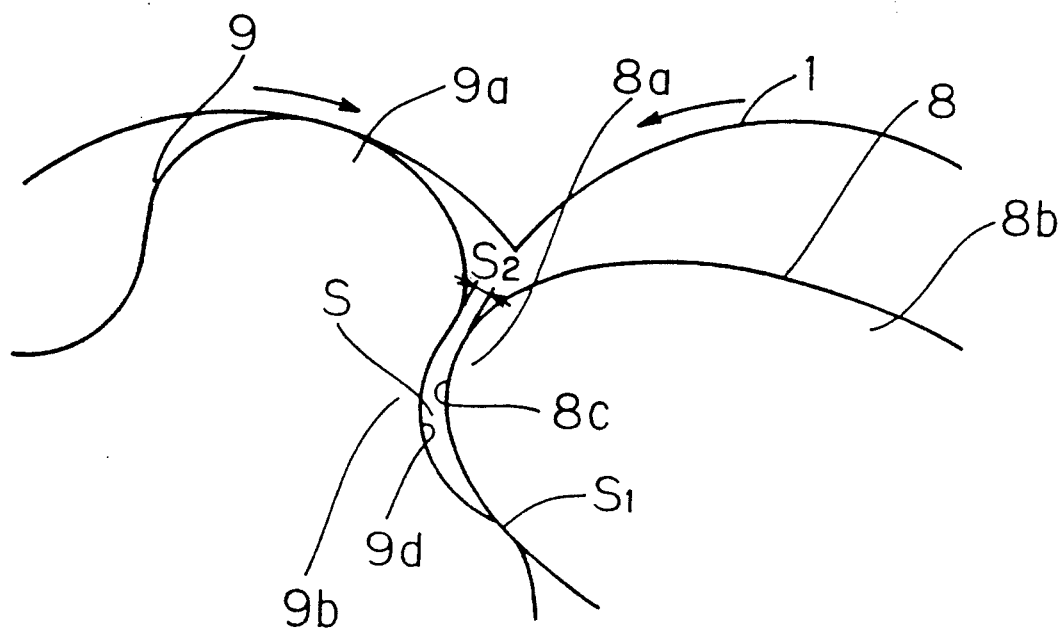
FIG. 7 is a partially enlarged explanatory view of FIG. 6.

Then, when the two paddles (8), (9) are rotated from the state of FIG. 5(d) in the direction of the arrows as illustrated in FIGS. 6, 7, a very small space s is formed just before the top (8c) of the major radius part (8a) of the paddle (8) comes into a complete engagement with the top (9d) of the minor radius part (9b) of the paddle (9). At this moment, establishing a gap on the front side of the small gap s between the two paddles (8), (9) in the rotaional direction as s1, and another gap on the rear side thereof as s2, an expression of s1>s2 is obtained. In this state, the gap S1 being a contact point is zero.

As the contact point s1 moves upward from the mentioned state according to the rotation of the two paddles (8), (9), the materials contained in the small space s are subject to a considerable compression and move toward the gap s2, which also resulting in a significant kneading effect.

Figure 8:
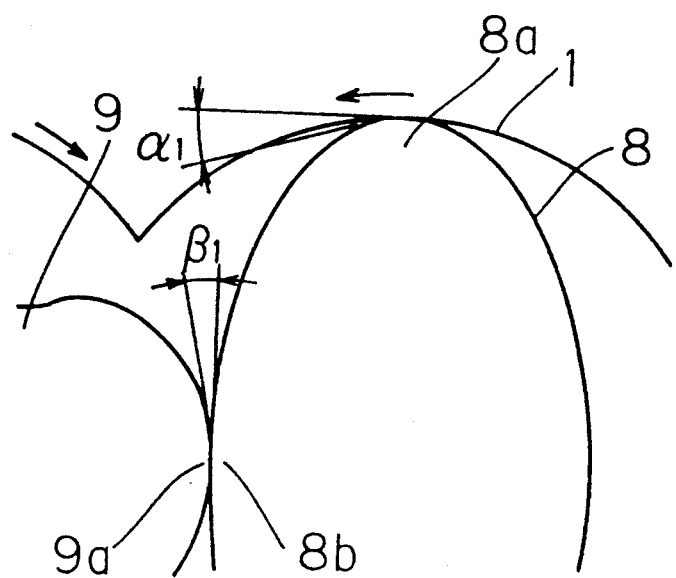
FIG. 8 is a partially enlarged explanatory view of the embodiment showing that top of the minor radius part of one paddle is in contact with top of the major radius part of another paddle.
Figure 14:
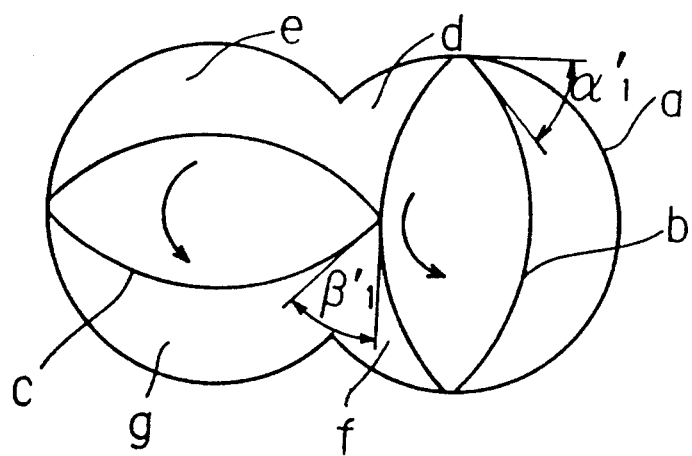
FIG. 14 is a longitudinal sectional view of the essential part of the prior kneading machine.
Figure 15A:
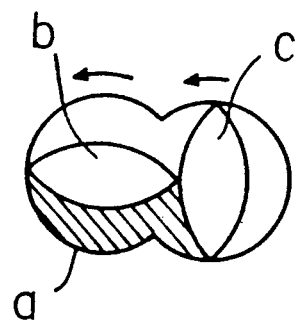
FIGS. 15(a), (b), (c) and (d) are respectively explanatory views showing kneading operation in the kneading machine.
Figure 15B:
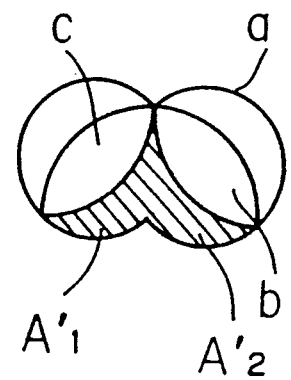
Figure 15C:
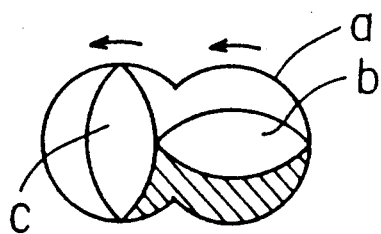
Figure 15D:
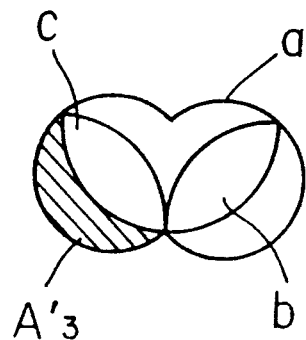

As shown in FIG. 8, an angle $\alpha 1$ formed between the curved top of the major radius part (8a) of the paddle 8 and the internal wall of the body (1), and an angle β1 formed between the curved top of the minor radius part (8b) of the paddle (8) and the curved top of the major radius part (9a) of the paddle (9) are both sharp. On the other hand, as shown in FIG. 14, angles α'1, β'1 of the prior art corresponding to the mentioned angles α1, β1 are larger than the angles α1, β1. Accordingly, in the invention, a shearing force is applied to the materials, whereby kneading is effectively performed.

The foregoing operation takes place not only in the pairs of paddles (8), (9) but also in the adjacent paddles (8), (9), as illustrated in FIG. 3. Since the mounting phase of the adjacent paddles (8), (9) are different little by little as mentioned above, when the materials are compressed due to the reduction in the material space, the materials come to be transferred to the adjacent material space and, as a result, it is achieved that the materials are moved in the direction of the arrow.

Figure 9:
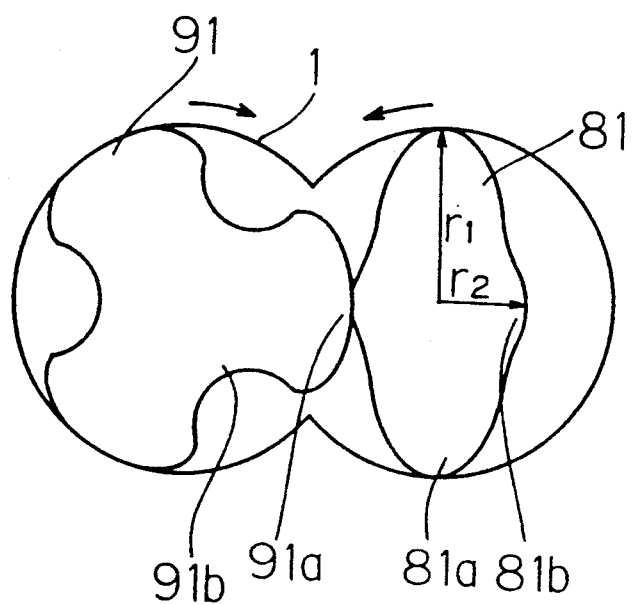
FIGS. 9 to 13 are explanatory view showing another embodiment of the continuous kneading machine according to the invention.

FIG. 9 shows another embodiment of the invention, and in which a paddle (81) is shaped so as to have two pairs of major radius parts (81a) and two pairs of minor radius parts (81b), and as to a paddle (91), ratio of rotation frequency of the paddles (81), (91) is established to be n1:m1=3:2 so that a trefoiled shape comprising three pairs of major radius parts (91a) and minor radius parts (91b) is formed by an escribed envelope curve in the same manner as the foregoing embodiment.

Figure 10:
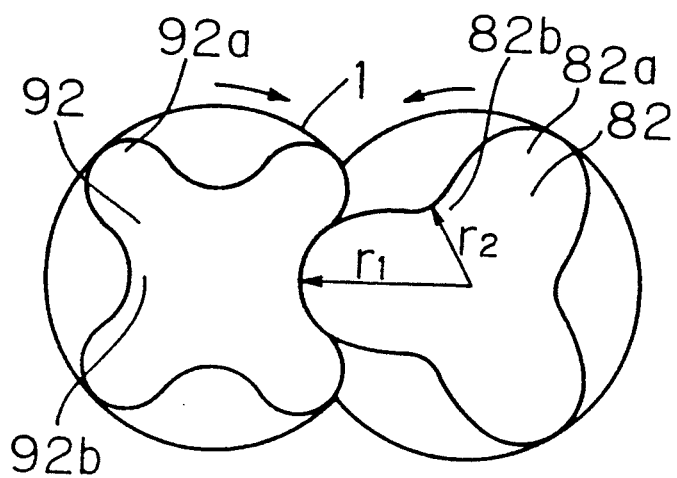

FIG. 10 shows a third embodiment of the invention, and in which a paddle (82) is formed so as to be a trefoiled shape divided by 120° and comprising three pairs of major radius parts (82a) and minor radius parts (82b). As to a paddle (92), ratio of rotation frequency of the paddles (82), (92) is established to be n1:m1=4:3 so that a quatrefoiled shape divided by 90° and comprising four pairs of major radius parts (92a) and minor radius parts (92b) are formed by an escribed envelope curve in the same manner as the foregoing embodiment.

Figure 11:
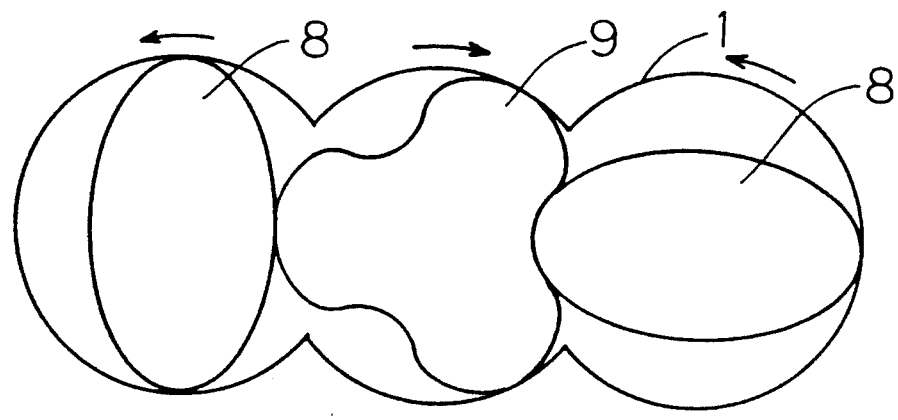

FIG. 11 shows a fourth embodiment of the invention, and in which a further paddle (8) (the same one as the mentioned paddle (8)) is additionally arranged in parallel to the mentioned combination of the paddles (8), (9) in the embodiment shown in FIG. 2 so as to form a three shaft type kneading machine.

Figure 12:
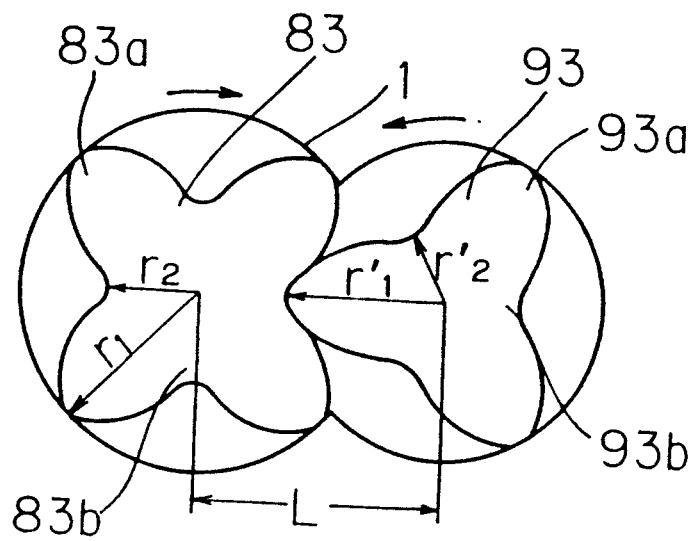

FIG. 12 shows a fifth embodiment of the invention, and in which a paddle (83) is formed so as to be a quatrefoiled shape comprising four pairs of major radius parts (83a) and minor radius parts (83b). A paddle (93) is formed so as to have an external diameter different from that (major radius x 2) of the paddle (83), and ratio of rotation frequency of the paddles (83), (93) is established to be n1:m1=3:4 so that a trefoiled shape comprising three pairs of major radius parts (93a) and minor radius parts (93b) is formed by an escribed envelope curve in the same manner as the foregoing embodiment.

In this respect, on the supposition that radiuses of the major radius part (83a) and minor radius part (83b) of the paddle (83) are respectively indicated by r1, r2, and radiuses of the major radius part (93a) and minor radius part (93b) of the paddle (93) are respectively indicated by r1', r2', a distance L between the shaft is expressed by L=R2+R'1.

Figure 13:
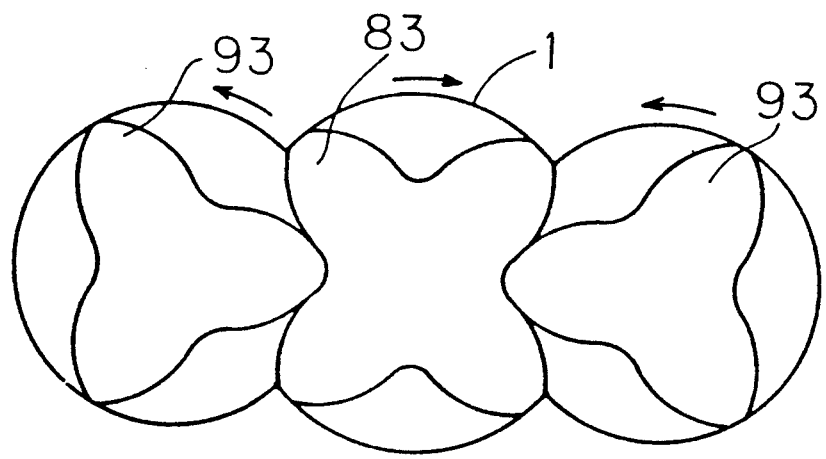

FIG. 13 shows a sixth embodiment of the invention, and in which a further paddle (93) is additionally arranged in parallel to the mentioned combination of the paddles (83), (93) in the mentioned fifth embodiment so as to form a three shaft type kneading machine.

Though the distance L between the shafts is established to be L=r1+r2 or L=r2+r'1 in the foregoing embodiments, it is preferred that actual distance between the shafts is established to be a little longer gap considering error in the manufacturing process.

Though simple mixture of a plurality of materials is described in the foregoing embodiments, the invention is also applicable to other kneading in which evaporation or chemical reaction takes place.

It is to be understood that the invention is not limited to the foregoing embodiments and that various changes and modifications may be made in the invention without departing from the spirit and scope thereof.

What is claimed is:

1. A continuous kneading machine comprising a cylindrical body of which sectional shape is formed of a plurality of circles partially crossover each other, rotaion shafts disposed in said circles in parallel thereto in the same number as said circles, and a number of paddles disposed on said rotation shafts forming a plurality of pairs so as to engage with each other, characterized in that sectional shape of one paddle in a section perpendicular to a rotation shaft is formed of n (where n is an integer, and n≧2) pairs of major radius parts and minor radius parts which are alternately arranged with equal angle therebetween and formed by a gentle curve, and that sectional shape of another paddle is formed of m (where m is an integer, m≧2, and n≠m) pairs of major radius parts and minor radius parts which are formed by an escribed envelope curve drawn by rotation in cooperation with said one paddle, and in which rotation of said another paddle is performed in a direction different from said rotation shaft of said one paddle at a different ratio of rotation frequency.

* * * * *